(12) United States Patent
Wooden

(10) Patent No.: US 8,123,014 B2
(45) Date of Patent: Feb. 28, 2012

(54) TWO-WAY ACTUATOR DEVICE IN A TORQUE TRANSMITTING ASSEMBLY

(75) Inventor: Elizabeth I. Wooden, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 422 days.

(21) Appl. No.: 12/366,779

(22) Filed: Feb. 6, 2009

(65) Prior Publication Data

US 2010/0200353 A1 Aug. 12, 2010

(51) Int. Cl.
*F16D 25/10* (2006.01)
*F16D 25/0638* (2006.01)
(52) U.S. Cl. ............. 192/48.613; 192/85.39; 192/85.45
(58) Field of Classification Search ............. 192/48.612, 192/48.613
See application file for complete search history.

(56) References Cited

U.S. PATENT DOCUMENTS

| | | | | |
|---|---|---|---|---|
| 2,919,778 A * | 1/1960 | Aschauer | ................. | 192/48.612 |
| 3,362,511 A * | 1/1968 | Aschauer | ..................... | 192/48.7 |
| 4,044,869 A * | 8/1977 | Gros | .......................... | 192/48.91 |
| 4,312,434 A * | 1/1982 | Ballendux | ............... | 192/48.613 |
| 2003/0089569 A1 * | 5/2003 | Antonov et al. | ........... | 192/48.92 |

* cited by examiner

*Primary Examiner* — David D Le
*Assistant Examiner* — Jacob S Scott

(57) ABSTRACT

A two way actuator in a torque transmitting assembly includes a piston member having a first side with a first contact surface and a second side opposite with a second contact surface. A backing member is sealed to the piston member. A first biasing member is disposed between the backing member and the piston member and a second biasing member is disposed between the piston member and a second member. The first torque transmitting device is engaged when a hydraulic fluid contacts the second side of the piston member and moves the piston member to contact the first torque transmitting device. The second torque transmitting device is engaged when the hydraulic fluid contacts the first side of the piston member and moves the piston member to contact the second torque transmitting device.

30 Claims, 3 Drawing Sheets

TWO-WAY ACTUATOR DEVICE IN A TORQUE TRANSMITTING ASSEMBLY

FIELD

The invention relates generally to a two-way actuator device in a torque transmitting assembly, and more particularly to a two-way actuator device operable to selectively engage two separate torque transmitting mechanisms in a transmission.

BACKGROUND

The statements in this section merely provide background information related to the present disclosure and may or may not constitute prior art.

A typical multi-speed automatic transmission uses a combination of torque transmitting devices, such as clutches, dog clutches/synchronizers, or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

In order to engage the torque transmitting devices, a typical automatic transmission includes a hydraulic clutch control system that employs a hydraulic fluid to selectively actuate pistons within the torque transmitting devices. Actuation of a piston in turn engages the torque transmitting elements (i.e., reaction discs or plates) within the torque transmitting device. However, each of these pistons adds weight, cost, and packaging size to the transmission. Accordingly, there is room in the art for a piston assembly that is operable to effectively engage more than one torque transmitting device in a transmission.

SUMMARY

The present invention provides a two way actuator in a torque transmitting assembly. The two way actuator is located between a first torque transmitting device and a second torque transmitting device. The actuator includes a piston member having a first side with a first contact surface and a second side opposite the first side. The second side has a second contact surface. The first contact surface is disposed proximate the first torque transmitting mechanism and the second contact surface is disposed proximate the second torque transmitting mechanism. A backing member is sealed to the piston member. A first biasing member is disposed between the backing member and the piston member and a second biasing member is disposed between the piston member and the second member. The first torque transmitting device is engaged when a hydraulic fluid contacts the second side of the piston member and moves the piston member to contact the first torque transmitting device. The second torque transmitting device is engaged when the hydraulic fluid contacts the first side of the piston member and moves the piston member to contact the second torque transmitting device.

In one aspect of the present invention, the piston and backing members are annular.

In another aspect of the present invention, the piston member includes a plurality of tab members and one of the first and second contact surfaces is located on an end of the plurality of tab members.

In yet another aspect of the present invention, each of the tab members have a radial portion that is located radially out from the piston member and an axial portion that is located axially parallel to an axis defined by the piston member.

In yet another aspect of the present invention, the second contact surface is located on a distal end of the axial portion of the tab member and the first contact surface is located on the radial portion of the tab member.

In yet another aspect of the present invention, the piston member is annular and defines an axis, and the piston member includes a first portion located parallel to the axis, a second portion connected to the first portion and located radially relative to the axis, a third portion connected to the second portion and located parallel to the axis, a fourth portion connected to the third portion and located radially relative to the axis, and a tab member connected to the fourth portion and having a radial portion that is located radially relative to the axis and having an axial portion that is located parallel to the axis.

In yet another aspect of the present invention, the third portion is concentric with the first portion.

In yet another aspect of the present invention, the first, second, third, and fourth portions are substantially annular and the second portion is disposed at an end of the first portion, the third portion is disposed at an end of the second portion, the fourth portion is disposed at an end of the third portion, and the tab member is disposed at an end of the fourth portion.

In yet another aspect of the present invention, the first side of the piston member is slidingly sealed to the backing member.

In yet another aspect of the present invention, the first contact surface of the piston member is located on a radially extending portion of the piston member.

In yet another aspect of the present invention, the second contact surface is located on a terminal end of the piston member.

In yet another aspect of the present invention, the first torque transmitting mechanism includes a first clutch pack connected to a first member and a second member and the second torque transmitting mechanism includes a second clutch pack connected to the second member and a third member.

In yet another aspect of the present invention, the backing member is sealed to a fourth member, and the fourth member defines a plurality of hydraulic fluid paths that communicate the hydraulic fluid to the first and second sides of the piston member.

In yet another aspect of the present invention, the first, second, third, and fourth members are shafts coupled to at least one of a transmission housing and a plurality of gear sets.

In yet another aspect of the present invention, the actuator assembly further includes an annular lip secured to the second side of the piston member and sealingly engaged with the second member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
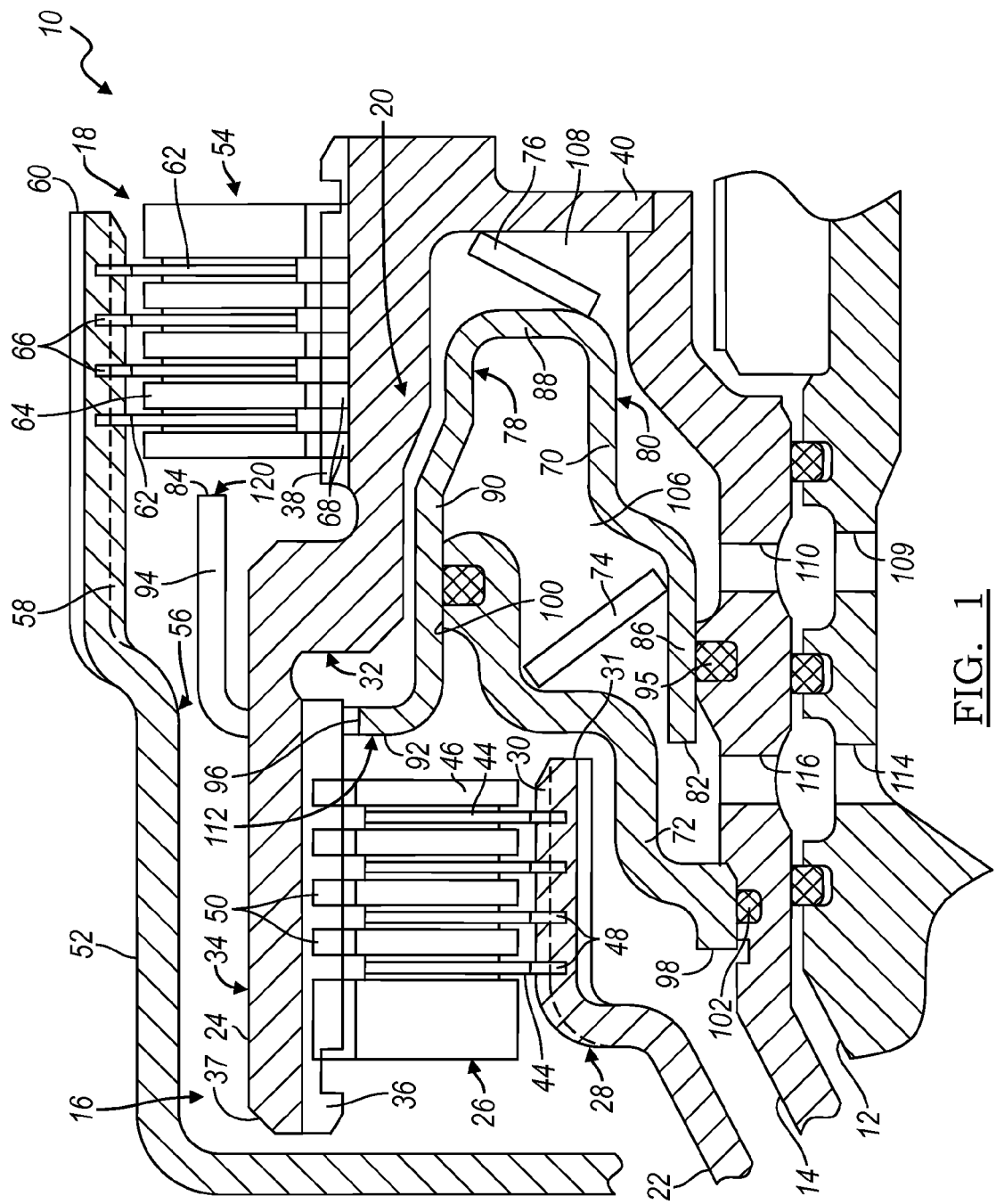
FIG. 1 is a diagrammatic cross-sectional view of a portion of an exemplary transmission having an actuator assembly according to the principles of the present invention.

With reference to FIG. 1, a portion of a transmission is generally indicated by reference number 10. The transmission 10 is employed in the present embodiment within a motor vehicle. The transmission 10 generally includes a main shaft 12, a sleeve shaft 14 concentric with the main shaft 12, a first torque transmitting device 16, a second torque transmitting device 18, and an actuator assembly 20. It should be appreciated that the transmission 10 may have additional torque transmitting devices, and preferably includes additional components such as shaft members a plurality of gear sets, without departing from the scope of the present invention. The first torque transmitting device 16 and the second torque transmitting device 18 are each operable to selectively couple various shaft members to various gears within the plurality of gear sets (not shown) within the transmission 10. Selective engagement of these torque transmitting devices 16, 18 allows for a plurality of forward and reverse gear ratios. Engagement of the torque transmitting devices 16, 18 is controlled by the actuator assembly 20, as will be described in greater detail below.

The first torque transmitting mechanism 16 is a friction clutch in the example provided, though various other types of mechanisms for transferring torque may be employed without departing from the scope of the present invention. The first torque transmitting device 16 includes a first member 22, a second member 24, and a selectively engageable clutch pack 26. The first member 22 is an annular shaft or member having an outer surface 28 that defines a spline 30. The spline 30 is located at a terminal end 31 of the first member 22. The opposite end (not shown) of the first member 22 is coupled to one or more various components within the transmission 10, such as, for example, gear sets, a torque converter, input shafts or coupling members, or a ground such as a transmission housing or other fixed component. Accordingly, the third member 52 may be either rotatable or fixed from rotation.

The second member 24 is a rotatable annular shaft or member having an inner surface 32 and an outer surface 34. The inner surface 32 defines a first spline 36. The first spline 36 is located at a terminal end 37 of the second member 24. The outer surface 34 defines a second spline 38. The second spline 38 is located between the terminal end 37 of the second member 24 and a portion 40 of the second member 24 that is coupled to the sleeve shaft 14.

The clutch pack 26 is located between the spline 30 of the first member 22 and the first spline 36 of the second member 24 and is accordingly operable to rotatingly couple the first member 22 with the second member 24. More specifically, the clutch pack 26 includes a first set of reaction discs 44 interleaved or intermeshed with a second set of reaction discs 46. The reaction discs 44, 46 may take various forms, such as, for example, opposing steel annular discs and fiber faced annular discs. The first set of reaction discs 44 include an inner radial surface 48 coupled to the spline 30 of the first member 22. The second set of reaction discs 46 include an outer radial surface 50 coupled to the first spline 36 of the second member 24. The reaction discs 44, 46 are moveable in an axial direction along the splines 30, 36 to engage one another, as will be described in greater detail below.

The second torque transmitting device 18 is similar to the first torque transmitting device 16 and is a friction clutch in the example provided, though various other types of mechanisms for transferring torque may be employed without departing from the scope of the present invention. The second torque transmitting device 18 includes a third member 52, a selectively engageable clutch pack 54, and also includes the second member 24. The third member 52 is an annular shaft or member having an inner surface 56 that defines a spline 58. The spline 58 is located at a terminal end 60 of the third member 52. The opposite end (not shown) of the third member 52 is coupled to one or more various components within the transmission 10, such as, for example, gear sets, a torque converter, input shafts or coupling members, or a ground such as a transmission housing or other fixed component. Accordingly, the third member 52 may be either rotatable or fixed from rotation.

The clutch pack 54 is located between the second spline 38 of the second member 24 and the spline 58 of the third member 52 and is accordingly operable to rotatingly couple the second member 24 with the third member 52. More specifically, the clutch pack 54 includes a first set of reaction discs 62 interleaved or intermeshed with a second set of reaction discs 64. The reaction discs 62, 64 may take various forms, such as, for example, opposing steel annular discs and fiber faced annular discs. The first set of reaction discs 62 include an outer radial surface 66 coupled to the spline 58 of the third member 52. The second set of reaction discs 64 include an inner radial surface 68 coupled to the second spline 38 of the second member 24. The reaction discs 62, 64 are moveable in an axial direction along the splines 38, 58 to engage one another, as will be described in greater detail below.

Figure 2:
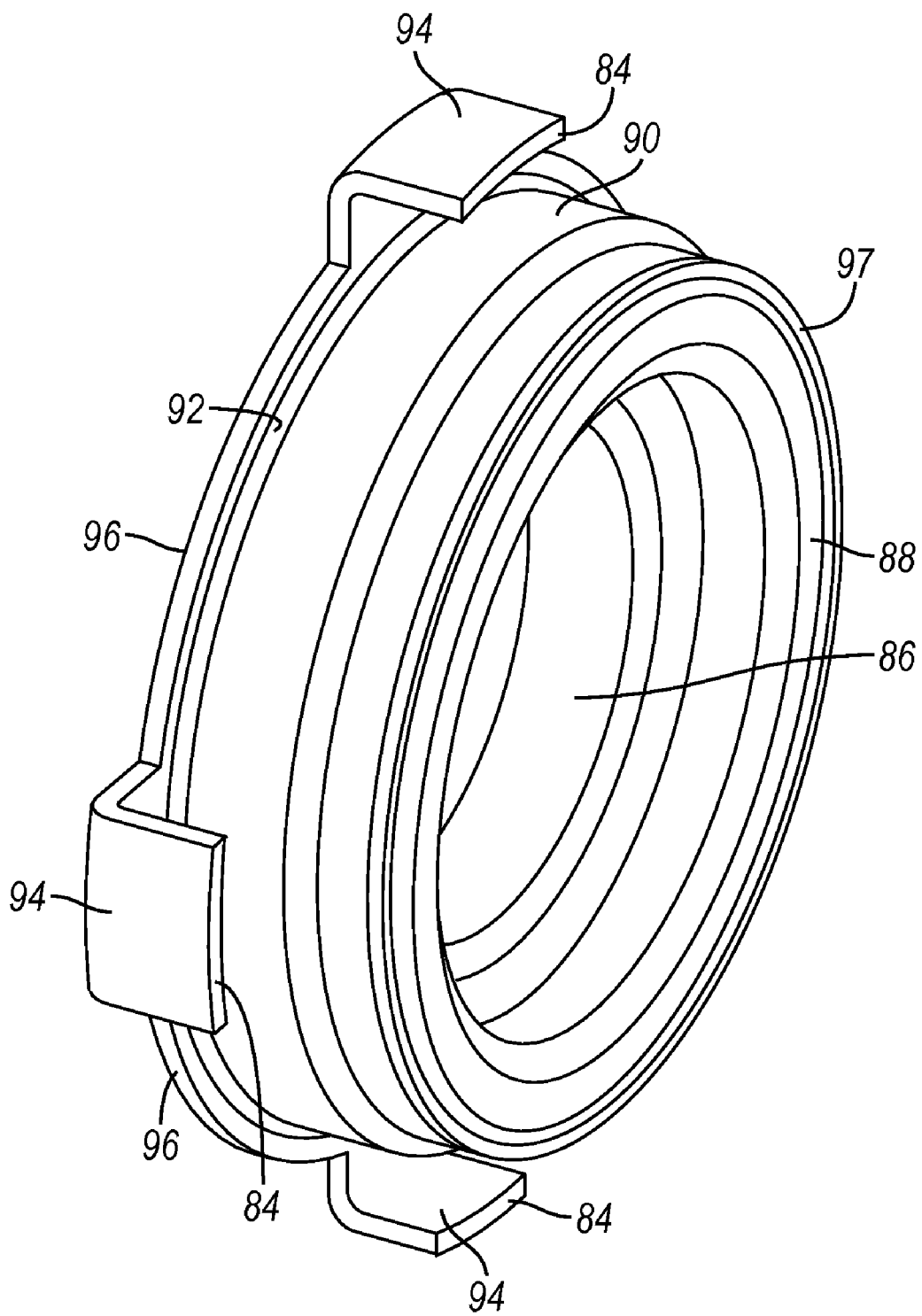
FIG. 2 is an isometric front view of a piston assembly according to the principles of the present invention.
Figure 3:
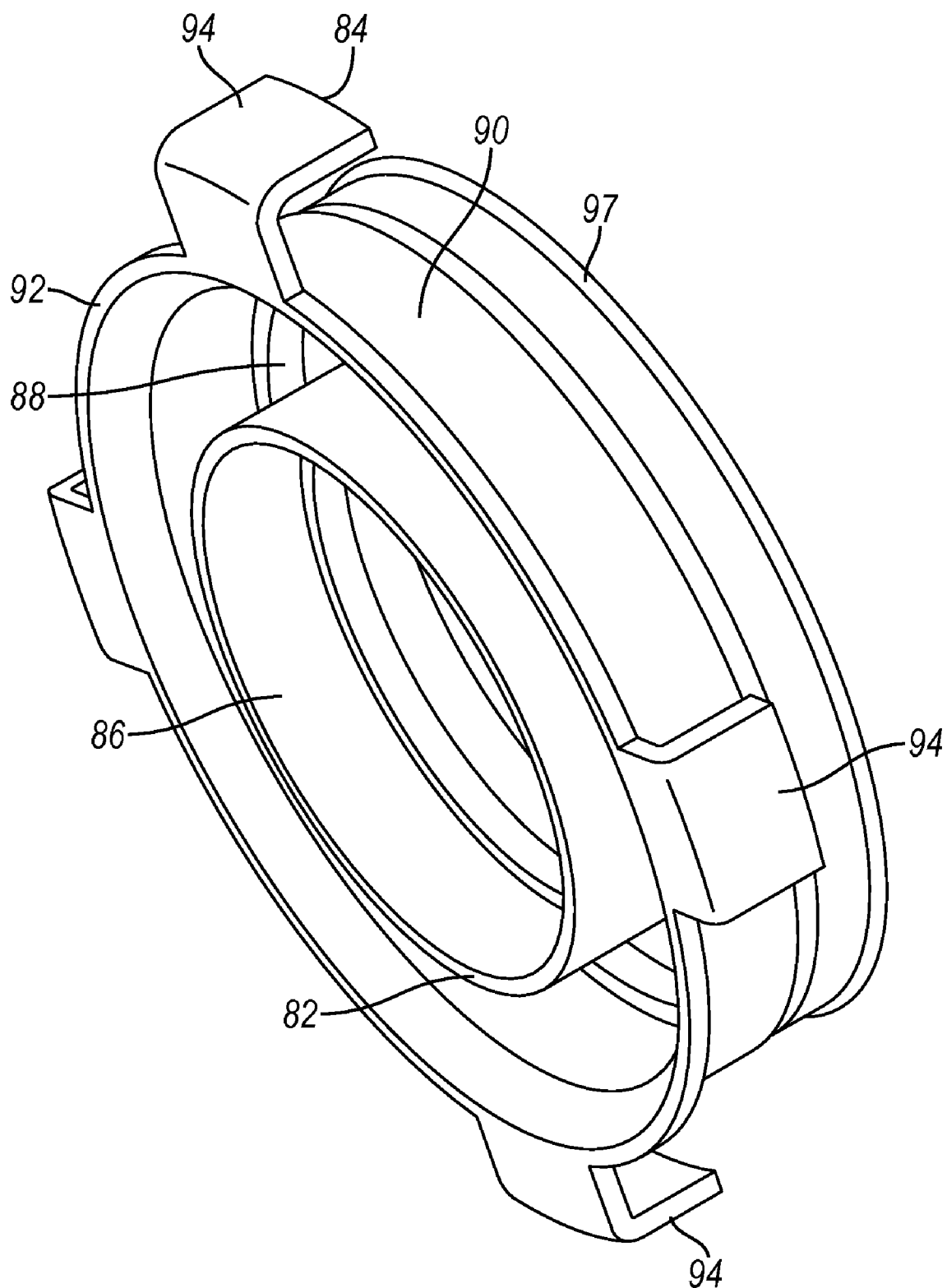
FIG. 3 is an isometric back view of the piston assembly according to the principles of the present invention.

The actuator assembly 20 includes a piston member 70, a backing member 72, a first biasing member 74, and a second biasing member 76. The actuator assembly 20 is operable to selectively engage the clutch packs 26, 54 of the first and second torque transmitting devices 16, 18. The piston member 70 is preferably a substantially "S" shaped annular member located substantially radially between the sleeve shaft 14 and the second member 24 and axially between the clutch pack 26 of the first torque transmitting mechanism 16 and the clutch pack 54 of the second torque transmitting mechanism 18. More specially, the piston member 70 includes a first side 78, a second side 80, a first end 82, and a second end 84. The piston member 70 also includes several portions or segments including a first portion 86, a second portion 88, a third portion 90, a fourth portion 92, and a fifth portion 94. The first portion 86 is located proximate the first end 82 and extends substantially axially parallel to the sleeve shaft 14. The second side 80 along the first portion 86 is sealed to the sleeve shaft 14 via a ring seal 95. The second portion 88 is located adjacent the first portion 86 and extends substantially radially between the sleeve shaft 14 and the second member 24. The third portion 90 is located adjacent the second portion 88 and extends substantially parallel to the first portion 86. The fourth portion 92 is located adjacent the third portion 90 and extends substantially radially. The piston member 70 further includes a plurality of tab members 94 that extend radially out from the fourth portion 92 and then extend substantially parallel to the first and third portions 86, 90 to form an "L" shape. In the example provided, the piston member 70 includes 4 tab members 94, however the piston member 70 may have any number of tab members 94 without departing from the scope of the present invention. Turning to FIGS. 2 and 3, the tab members 94 define a plurality of windows 96 between adjacent tab members 94. The windows 96 are sized and positioned such that the first spline 36 of the second member 24 is disposed through the window 96 (i.e. between the tab members 94). A lip or ring seal 97 is coupled to the edge between the second and third portions 88, 90 on the second side 80 of the piston member 70. The lip 97 is sealing engaged to the inner surface 32 of the second member 24.

Turning back to FIG. 1, the backing member 72 is generally annular and may have various shapes without departing from the scope of the present invention. The backing member 72 includes a first end 98 and a second end 100. The first end 98 is fixedly sealed to the sleeve shaft 14 via a ring seal 102. The second end 100 is sealed to the first side 78 along the third portion 90 of the piston member 70.

The first side 78 of the piston member 70 and the backing member 72 cooperate to define a first fluid chamber 106. The first biasing member 74 is located within the first fluid chamber 106 and engages the backing member 72 and the piston member 70. The first biasing member 74 may take various forms, such as, for example, a coil spring or leaf spring. The second side 80 of the piston member 70, the sleeve shaft 14, and the inner surface 32 of the second member 24 cooperate to define a second fluid chamber 108. The second biasing member 76 is located within the second fluid chamber 108 and engages the piston member 70 and the second member 24. The second biasing member 76 may take various forms, such as, for example, a coil spring or leaf spring. The piston member 70 is moveable in the axial direction relative to the backing member 72 upon actuation by a hydraulic fluid. The biasing members 74, 76 operate to keep the piston member 70 in a disengaged position when there is no hydraulic fluid acting on the piston member 70.

In order to engage the first torque transmitting device 16, hydraulic fluid is pumped into the second fluid chamber 108 to apply the piston member 70. More specifically, hydraulic fluid is communicated from a hydraulic control system (not shown) through a first fluid passage 109 disposed in the main shaft 12, through a first fluid passage 110 disposed in the sleeve shaft 14 and into the second fluid chamber 108. The pressurized hydraulic fluid contacts the second side 80 of the piston member 70 and moves the piston member 70 against the bias of the first basing member 74 (i.e. towards the first torque transmitting device 16). A contact surface 112 on the first side 78 along the fourth portion 92 (or in addition or alternately on the tab member 94) of the piston member 70 contacts the clutch pack 26 of the first torque transmitting device 16 and urges the reaction discs 44, 46 together, thereby coupling the first member 22 to the second member 24.

In order to engage the second torque transmitting device 18, hydraulic fluid is pumped into the first fluid chamber 106 to apply the piston member 70. More specifically, hydraulic fluid is communicated from a hydraulic control system (not shown) through a second fluid passage 114 disposed in the main shaft 12, through a second fluid passage 116 disposed in the sleeve shaft 14 and into the first fluid chamber 106. The pressurized hydraulic fluid contacts the first side 78 of the piston member 70 and moves the piston member 70 against the bias of the second biasing member 76 (i.e. towards the second torque transmitting device 18). A contact surface 120 on the second end 84 of the tab member 94 of the piston member 70 contacts the clutch pack 54 of the second torque transmitting device 18 and urges the reaction discs 62, 64 together, thereby coupling the second member 24 to the third member 52.

The description of the invention is merely exemplary in nature and variations that do not depart from the gist of the invention are intended to be within the scope of the invention. Such variations are not to be regarded as a departure from the spirit and scope of the invention.

What is claimed is:

1. An assembly for selectively engaging a first torque transmitting mechanism and a second torque transmitting mechanism, the assembly comprising:
    a piston member having a first side with a first side contact surface and a second side opposite the first side, the second side having a second side contact surface, wherein the first side contact surface is disposed proximate the first torque transmitting mechanism and the second side contact surface is disposed proximate the second torque transmitting mechanism, and wherein the piston member includes a plurality of tab members wherein the first and second side contact surfaces are disposed at opposite ends of the plurality of tab members;
    a second member disposed proximate the piston member, wherein the second member and the piston member cooperate to define a first fluid chamber;
    a backing member sealed to the piston member, wherein the backing member and the piston member cooperate to define a second fluid chamber;
    a first biasing member disposed within the first fluid chamber; and
    a second biasing member disposed within the second fluid chamber, and
    wherein the first torque transmitting device is engaged when a pressure produced by a hydraulic fluid in the first fluid chamber creates a force on the piston member that exceeds a force exerted by the second biasing member and wherein the second torque transmitting device is engaged when a pressure produced by a hydraulic fluid in the second fluid chamber creates a force on the piston member that exceeds a force exerted by the first biasing member.

2. The assembly of claim 1 wherein the piston and backing members are annular.

3. The assembly of claim 1 wherein each of the plurality of tab members has a radial portion that is located at a radially outer portion of the piston member and an axial portion that is located axially parallel to an axis defined by the piston member.

4. The assembly of claim 3 wherein the second side contact surface is located on a distal end of the axial portion of at least one of the plurality of tab members and the first side contact surface is located on the radial portion of the at least one of the plurality of tab members.

5. The assembly of claim 1 wherein the piston member is annular and defines an axis, wherein the piston member includes a first portion located parallel to the axis, a second portion connected to the first portion and located radially relative to the axis, a third portion connected to the second portion and located parallel to the axis, a fourth portion connected to the third portion and located radially relative to the axis, and a tab member connected to the fourth portion and having a radial portion that is located radially relative to the axis and having an axial portion that is located parallel to the axis.

6. The assembly of claim 5 wherein the third portion is concentric with the first portion.

7. The assembly of claim 6 wherein the first, second, third, and fourth portions are substantially annular and the second portion is disposed at an end of the first portion, the third portion is disposed at an end of the second portion, the fourth portion is disposed at an end of the third portion, and the tab member is disposed at an end of the fourth portion.

8. The assembly of claim 1 wherein the first side of the piston member is slidingly sealed to the backing member.

9. The assembly of claim 1 wherein the first side contact surface of the piston member is located on a radially extending portion of the piston member.

10. The assembly of claim 9 wherein the second side contact surface is located on a terminal end of the piston member.

11. The assembly of claim 1 wherein the first torque transmitting mechanism includes a first clutch pack connected to a first member and the second member and the second torque transmitting mechanism includes a second clutch pack connected to the second member and a third member.

12. The assembly of claim 11 wherein the backing member is sealed to a third member, and the third member defines a plurality of hydraulic fluid paths that communicate the hydraulic fluid to the first and second fluid chambers.

13. The assembly of claim 12 wherein the first, second, and third members are shafts coupled to at least one of a transmission housing and a plurality of gear sets.

14. The assembly of claim 1 wherein the actuator assembly further includes an annular lip secured to the second side of the piston member and sealingly engaged with the second member.

15. A torque-transmitting assembly comprising:
a first torque transmitting mechanism having a first clutch pack connected to a first member and a second member;
a second torque transmitting mechanism having a second clutch pack connected to the second member and a third member;
an actuator assembly disposed between the first torque transmitting mechanism and the second torque transmitting mechanism, the actuator assembly comprising:
a piston member having a first side with a first side contact surface and a second side opposite the first side, the second side having a second side contact surface, wherein the first side contact surface is disposed proximate the first clutch pack and the second side contact surface is disposed proximate the second clutch pack and wherein the piston member includes a plurality of tab members, wherein the first and second side contact surfaces are disposed at opposite ends of the plurality of tab members;
a backing member sealed to the piston member;
a first biasing member disposed between the backing member and the piston member; and
a second biasing member disposed between the piston member and the second member,
wherein the first torque transmitting device is engaged when a hydraulic fluid contacts the second side of the piston member and moves the piston member towards the first torque transmitting device and the first side contact surface contacts the first clutch pack of the first torque transmitting device, and
wherein the second torque transmitting device is engaged when a hydraulic fluid contacts the first side of the piston member and moves the piston member towards the second torque transmitting device and the second side contact surface contacts the second clutch pack of the second torque transmitting device.

16. The torque transmitting assembly of claim 15 wherein the piston and backing member are annular.

17. The torque transmitting assembly of claim 15 wherein the second member extends between adjacent tab members on the piston member.

18. The torque transmitting assembly of claim 17 wherein each of the plurality of tab members has a radial portion that is located radially out from the piston member and an axial portion that is located axially parallel to an axis defined by the piston member.

19. The torque transmitting assembly of claim 18 wherein the second side contact surface is located on each of a distal end of the axial portion of the plurality of tab members and the first side contact surface is located on each of the radial portion of the plurality of tab members.

20. The torque transmitting assembly of claim 15 wherein the piston member is annular and defines an axis, wherein the piston member includes a first portion located parallel to the axis, a second portion connected to the first portion and located radially relative to the axis, a third portion connected to the second portion and located parallel to the axis, a fourth portion connected to the third portion and located radially relative to the axis, and a tab member connected to the fourth portion and having a radial portion that is located radially relative to the axis and having an axial portion that is located parallel to the axis.

21. The torque transmitting assembly of claim 20 wherein the third portion is concentric with the first portion.

22. The torque transmitting assembly of claim 21 wherein the first, second, third, and fourth portions are substantially annular and the second portion is disposed at an end of the first portion, the third portion is disposed at an end of the second portion, the fourth portion is disposed at an end of the third portion, and the tab member is disposed at an end of the fourth portion.

23. The torque transmitting assembly of claim 15 wherein the second side of the piston member is slidingly sealed to the second member.

24. The torque transmitting assembly of claim 23 wherein the first side of the piston member is slidingly sealed to the backing member.

25. The torque transmitting assembly of claim 15 wherein the first side contact surface of the piston member is located on a radially extending portion of the piston member.

26. The torque transmitting assembly of claim 25 wherein the second side contact surface is located on a terminal end of the piston member.

27. The torque transmitting assembly of claim 15 wherein the backing member is sealed to a fourth member, and the fourth member defines a plurality of hydraulic fluid paths that communicate the hydraulic fluid to the first and second sides of the piston member.

28. The torque transmitting assembly of claim 27 wherein the first, second, third, and fourth members are shafts coupled to at least one of a transmission housing and a plurality of gear sets.

29. The torque transmitting assembly of claim 15 wherein the actuator assembly further includes an annular lip secured to the second side of the piston member and sealingly engaged with the second member.

30. A torque-transmitting assembly comprising:
a first torque transmitting mechanism having a first clutch pack connected to a first member and connected to a second member;
a second torque transmitting mechanism having a second clutch pack connected to the second member and connected to a third member;
an actuator assembly disposed between the first torque transmitting mechanism and the second torque transmitting mechanism, the actuator assembly comprising:
an annular piston member having a first side with a first side contact surface and a second side opposite the first side, the second side having a second side contact surface, the annular piston member having a tab member disposed on an outer edge of the annular piston member, wherein the first side contact surface is disposed proximate the first clutch pack on an end of the tab member and the second side contact surface is disposed proximate the second clutch pack;

a backing member sealed to the annular piston member;

a first biasing member disposed between the backing member and the annular piston member; and a second biasing member disposed between the annular piston member and the second member, wherein the first torque transmitting device is engaged when a hydraulic fluid contacts the second side of the annular piston member and moves the annular piston member towards the first torque transmitting device and the first side contact surface contacts the first clutch pack of the first torque transmitting device, and wherein the second torque transmitting device is engaged when a hydraulic fluid contacts the first side of the annular piston member and moves the annular piston member towards the second torque transmitting device and the second side contact surface contacts the second clutch pack of the second torque transmitting device.

* * * * *